July 18, 1939.　　　D. G. JENSEN　　　2,166,438
FLOUR SIFTING MACHINE
Original Filed Feb. 4, 1935　　2 Sheets-Sheet 2
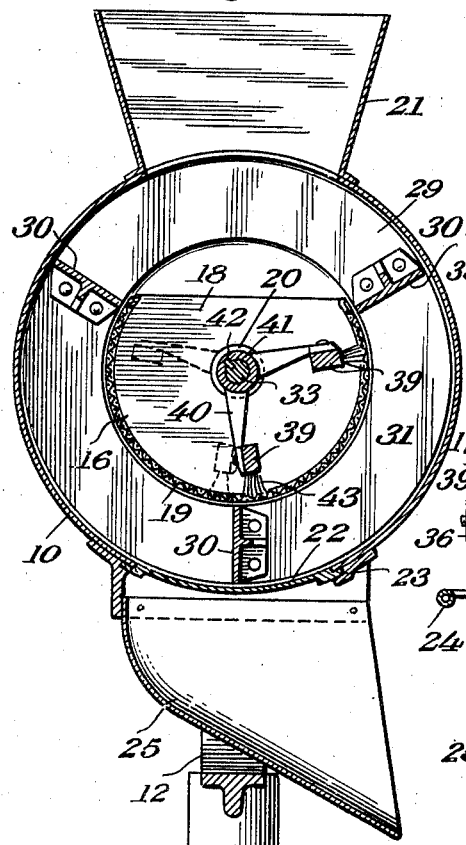
Inventor
Donald G. Jensen
Maréchal & Noe
Attorneys Patented July 18, 1939

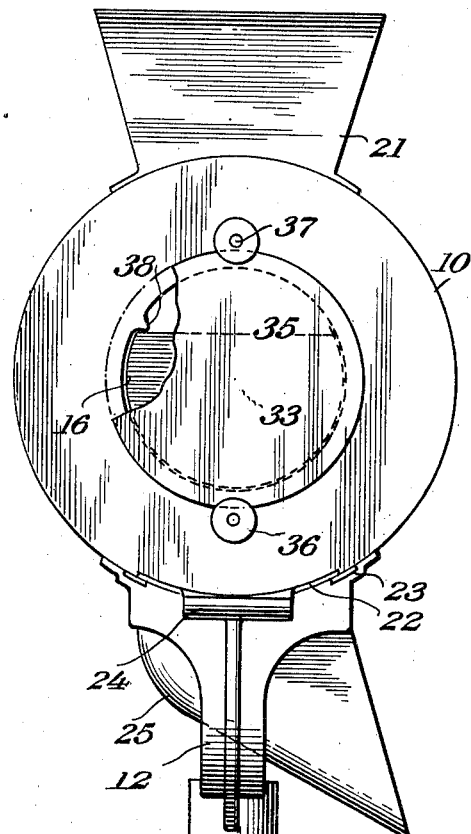
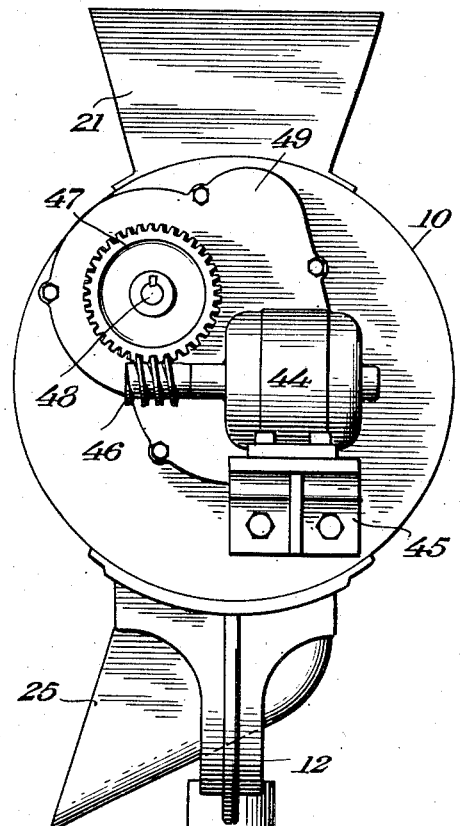
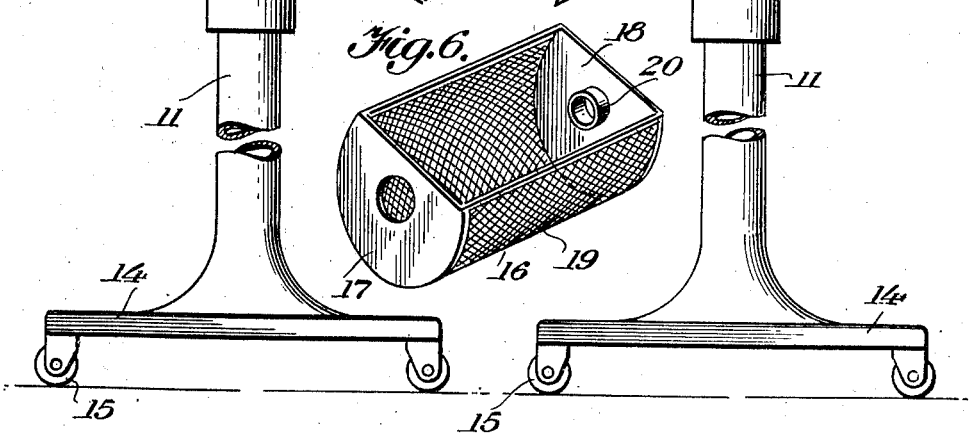

2,166,438

UNITED STATES PATENT OFFICE 2,166,438

FLOUR SIFTING MACHINE

Donald G. Jensen, Cincinnati, Ohio, assignor to The Hobart Manufacturing Company, Troy, Ohio, a corporation of Ohio Continuation of application Serial No. 4,953, February 4, 1935. This application June 11, 1936, Serial No. 84,778

9 Claims. (Cl. 209—240)

The object of the invention is to provide a flour sifting machine in which the sifting operation is attended with a continuous return of the flour to the screen after its passage through the latter, so that the necessary lightness is secured without the series of independent operations usually attending the sifting of flour prior to the kneading process; to provide a flour sifting machine in which the continuous sifting operation is automatically carried out, whereby, after a specified time, the sifted flour may be removed and thus be found in the proper condition to begin the kneading process; and generally to provide a machine of the kind indicated, which is of simple form, composed of but few parts, susceptible of cheap manufacture and of a form and arrangement of parts that reduce the likelihood of disarrangement of the latter to a minimum.

It is a further object to provide a device of this character adapted to have an effective mixing action such that complete intermixture of flour or the like with other pulverulent materials will be quickly obtained even where such other materials are present in only small quantities.

With these objects in view, the invention consists in a construction and combination of parts, of which a preferred embodiment is illustrated in the accompanying drawings, wherein:

Fig. 1 is an end elevational view, partly broken away, of a flour machine constructed in accordance with the invention;

Fig. 2 is similarly an end elevational view but opposite to that of Fig. 1;

Fig. 3 is a transverse vertical sectional view;

Fig. 4 is a central vertical longitudinal sectional view;

Fig. 5 is a sectional view indicated by the plane on line 5—5 of Fig. 4; and

Fig. 6 is a perspective view of the sifting screen.

This application is a continuation of application Serial No. 4953, filed February 4, 1935 and assigned to the same assignee as this application.

The improved machine comprises a cylindrical housing 10 disposed with its axis horizontal and supported on a standard 11, carrying at its upper end a yoke 12 with which the housing is connected. The standard is carried by a base 14 equipped preferably with casters 15 to permit ready translation of the device from one point to another.

Disposed within the housing 10 in axial coincidence with the latter is a sifting screen 16. This screen is of generally cylindrical form, consisting of the end plates 17 and 18 and the reticulated member 19 enclosing a generally cylindrical screen chamber. The end plates are of segmental form but are greater than a half circle, and the end plate 18 is formed with an inwardly extending sleeve extension 20. The reticulated member is coextensive for all of that part of the peripheries of the end plates which are circular, so that the flat or straight sides both of the plates and of the reticulated member define the open top of the screen through which flour reaches the latter.

The housing 10 is formed at the top with an opening which is bounded with a hopper 21. Likewise, it is formed with a similar opening at the bottom, which constitutes a discharge opening. This discharge opening, however, is closed with a gate 22 mounted in slides 23. The gate is terminally formed with a handle portion 24, so that it may be withdrawn for the discharge of flour from the housing into the chute 25, the latter being attached to the housing on the under side in bounding relation to the opening closed by the gate 22. The chute is arranged to discharge at the side of the standard, so that the sifted flour may readily pass into a suitably placed receptacle.

The housing 10 at one end is formed with a bearing 26, bushed as indicated at 27, the bushing being preferably of a chemically treated wood, so that lubrication may be unnecessary. In the bearing there is received the hub 28 of a disk 29, which is disposed within the housing next to that wall in which the bearing 26 is formed. On one face the disk carries the paddles 30, which are uniformly spaced angularly around the disk and traverse the annular space 31 within the housing exterior to the screen 16. The disk is designed to be rotated, and thus the paddles move in an orbital path around the screen, picking up flour which has passed through the latter and returning it to the screen through the open top side thereof. The annular space 31 forming a receiving chamber for sifted materials extends throughout the axial length of the screen and is of sufficient depth so that it has substantial capacity for sifted material, comparable with that of the screen chamber.

While the hub 28 rotates in the bearing 26 of the end wall of the housing, it likewise serves as a bearing for the shaft 33, being bushed, as indicated at 34, this bushing 34 being of the same material as the bushing 27, so that lubrication may be unnecessary. The bushing 34 projects far enough beyond the inner face of the disk 29 to act as a support for the screen at the plate 18, the bushing entering the sleeve 20 when the screen is placed in position.

That end of the housing remote from that in which the bearing 26 is formed is closed with a removable plate 35, which is retained in position by nuts 36 engaging threaded studs 37 set in the end wall of the housing, the nuts overlapping the plate 35 when screwed home. The plate 35 on the inner face is provided with a thrust bearing for the outer end of the shaft 33.

Since the disk 29 rotates in the operation of the invention, and since it acts as the support for the inner end of the screen, which must be held stationary, the opening in the end wall closed by the plate 35 is formed with lugs 38, which extend over the upper edge of the plate 17 of the screen and thus preclude any rotation of the latter.

Disposed within the screen chamber are agitators in the form of bars 39, which are carried by arms 40 extending from the sleeve 41, the latter being keyed to the shaft 33 as indicated at 42. The arms 40 are preferably angularly spaced 90°, while the bars 39 carry bristles 43 which wipe the inner surface of the screen. The agitators oscillate in the operation of the invention, the arc of oscillation being 90°. Therefore, there is imparted to the shaft 33 an oscillatory movement, while there is imparted to the disk 29 a constant angular or turning movement. But both motions are secured from the driving motor 44 suitably supported, as on a shelf 45, from one of the end walls of the casing or housing. The shaft of the motor carries a worm 46 meshing with a worm gear 47, keyed to a shaft 48. The shaft 48 is suitably journalled in a bearing in one of the end walls of the casing or housing 10 and extends through an appropriate bearing in the gear case 49 bolted to the end wall of the housing. Interior to the gear case, the shaft 48 carries a pinion 50 and a gear 51, these two being preferably pinned together, but, of course, keyed to the shaft 48. The pinion meshes with a gear 52 secured to the hub 28, so that when the motor rotates, the disk and with it the paddles 30 are continuously rotated.

While the pinion 50 drives the gear 52, the gear 51 meshes with and drives the pinion 53, which is carried by the shaft 54, and drives the crank 55, the latter having a connecting rod 56 connected with the crank 57 mounted on the inner end of the shaft 33. The relative lengths of the cranks 55 and 57 are such that a 90° movement of the latter is secured through a 180° movement of the former. Thus, the pinion 53 for the first half of the revolution will rock the shaft 33 90° in one direction, returning it the same angular distance during the succeeding half revolution. Thus, the agitators are swung 90° within the screen but, being spaced 90° apart, they have the effect of 180° movement and the screen is wiped with the brushes throughout an angular extent of 180°. With the drive means as described provision is made for driving the oscillating brushes at a considerably faster speed than the speed of rotation of paddles 30. This provides for the sifting of a substantial quantity of flour into annular chamber 31 between the passage of each of the paddles 30 therethrough so that a considerable quantity of the flour is maintained in this chamber during the operation of the device. In this way the capacity of the device is increased, the screen chamber and the annular chamber 31 both holding substantial quantities of flour during the operation of the sifter. Thus for example, in the embodiment shown herein, gear train 51, 53 provides for driving the oscillating mechanism at a step-up ratio of about 3 to 1. Similarly gear train 50, 52 provides for driving the rotating paddles at a reduced ratio of similar amount, the oscillatory brushes thus operating considerably faster than the paddles. For example in the embodiment shown and comprising three paddle blades, satisfactory results in operation have been secured where the brushes operate through from about 6 to 10 cycles of oscillation for each cycle of rotation of the paddles.

Thus provision is made for effecting a number of oscillatory cycles of operation of the brush members for each sweep of one of the rotating paddles, such action of the brush members working over the screen providing for the sifting of the flour at the desired rate into the annular chamber. Through this correlation of the screening and the returning action, the desired distribution of the flour in both the screen chamber and in the annular chamber is maintained.

It will also be noted that the drive and linkage mechanism employed provides for a slow motion of the brushes at either extremity of their oscillating path of travel, thus avoiding the throwing of flour out of the screen chamber.

In the operation of the machine, the desired amount of flour is deposited into the screen chamber through the hopper 21 and, when the motor is set in operation, the agitators move back and forth through the flour, causing it to be passed through the screen, when the continuously moving paddles gather it from the annular receiving chamber in which they move and return it to the screen through the open upper side thereof. This operation continues until the desired lightness is secured, when the withdrawal of the gate 24 will permit deposit of the sifted flour into a receptacle suitably placed below the chute 25.

In addition to effecting a sifting action to separate out impurities and foreign matter with an accompanying lightening and aerating of the flour or other pulverulent material, the device also provides a highly effective mixing action. In the preparation of the dry ingredients for baking purposes flour is mixed with other dry materials such as salt, baking powder, etc., which latter materials are usually present in relatively small quantities in proportion to the quantity of flour. It is important that a highly uniform and thorough intermixture of all the ingredients be obtained in order to secure the best results in baking, and the proper incorporation and distribution of such small quantities of materials into the flour has heretofore been a difficult matter. In accordance with the present invention a highly effective mixing action is obtained so that properly homogeneous mixtures of the dry ingredients, having desired characteristics of lightness and aeration, are secured. A mixing is obtained in the screen chamber where the oscillating action of the brushes traversing the chamber causes the materials to be continually lifted up and dropped from one side of the chamber to the other. And the screening action is further so correlated with the returning action of the paddles that as each portion of the flour is screened and picked up by the paddles for return to the screen chamber, it is dropped into the screen chamber in the presence of a different portion of the material. Where the number of paddle blades is few, such as in the embodiment shown, each paddle discharges a substantial quantity of sifted material into the screen chamber, and there then occurs a delay until the succeeding paddle discharges its material producing a fluctuation in the quantity of material in the screen chamber. Thus the supply and discharge of material to and from the screen chamber does not maintain a uniform balance and the ingredients do not follow progressively around through the device with one portion failing to mix with another, but each sifted portion is continually returned into the presence of a different portion in the screen chamber, with which intermixture occurs. Such correlated relation of the screening action and the withdrawal and return of substantial quantities of the sifted materials to the screen chamber provides for quickly accomplishing a highly effective mixing action as well as providing proper sifting.

The removable plate 35 provides for ready cleaning when necessary. The removal of the nuts 36 will permit removal of the plate, after which the agitators may be withdrawn from the shaft 33 and the screen lifted out from its position within the housing.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A flour sifting machine comprising a sifting screen of generally cylindrical form forming a screen chamber, a cylindrical housing in which said screen is disposed to define an annular chamber exterior to the screen, means continuously moving in said annular chamber to successively return the flour to the screen and means operating over said screen to effect the sifting of flour therethrough into said annular chamber at a rate correlated with that of the moving means to provide desired distribution of the flour in substantial part in both said screen chamber and in said annular chamber.

2. A flour sifting machine comprising a cylindrical housing, a sifting screen of generally cylindrical form disposed concentrically in said housing to define an annular flour receiving space between it and the housing, a series of paddles disposed in said annular space and moving in an orbital path around said screen, an oscillatory member disposed within the screen to work flour received in the latter through the same, the paddles continuously returning the sifted flour to the screen, and means for driving said paddles and said oscillatory member in correlated relation to each other to provide the desired distribution of the flour both in said screen and in said annular space.

3. A flour sifting machine comprising a cylindrical housing, a generally cylindrical sifting screen disposed concentrically in the housing and spaced from the cylinder walls thereof to define an annular flour receiving chamber, a series of spaced paddles disposed in said annular chamber and movable in an orbital path around the screen, means within the screen for working through the latter flour received in the same, the paddles continuously returning the flour received in the annular chamber to the screen, and means for operating the screening means in correlated relation with said paddles providing for the sifting of a substantial quantity of flour into said flour receiving chamber between the passage of successive paddles therethrough.

4. A flour sifting machine comprising a cylindrical housing disposed with its axis horizontal, a sifting screen of generally cylindrical form disposed within and axially coincident with the housing but spaced from the walls of the latter to define an annular flour receiving chamber, oscillatory agitating members disposed within the screen to work through the latter flour received in the same, a series of paddles disposed within the annular receiving chamber and movable therethrough to effect return of sifted flour to said screen, a driving motor, and operative connections between said driving motor, the paddles and the agitators providing for the driving of said agitating members at a speed considerably faster than the speed of operation of said paddles.

5. A flour sifting machine comprising a cylindrical housing disposed with its axis horizontal and formed with openings on the upper and lower sides, a hopper bounding the opening on the upper side, a chute bounding the opening on the lower side, a slidable gate closing the lower opening, a sifting screen of generally cylindrical form disposed within the housing and concentric with the latter to define an annular flour receiving chamber exterior to the screen, the screen having an open side directly below the hopper, agitators disposed within the screen, paddles disposed in the annular chamber, and means operatively connected with the paddles and with the agitators to oscillate the latter within the screen and continuously rotate the former in an orbital path around the screen to effect return of sifted flour to said screen.

6. A flour sifting machine comprising a cylindrical housing disposed with its axis horizontal and formed with openings on the upper and lower sides, a hopper bounding the opening on the upper side, a chute bounding the opening on the lower side, a slidable gate closing the lower opening, a sifting screen of generally cylindrical form disposed within the housing and concentric therewith to define an annular flour receiving chamber, said screen having an open side directly below the hopper, agitators disposed within the screen, paddles disposed in the annular chamber, and means operatively connected with the paddles and with the agitators to oscillate the latter within the screen and continuously rotate the former in an orbital path around the screen, the agitators embodying angularly spaced brushes wiping the interior surface of the screen and the paddles being uniformly spaced angularly in said annular chamber.

7. A sifting device for sifting finely divided material of the character described and securing intermixture thereof which comprises a housing, a screen chamber including a screen spaced from said housing and forming therewith a chamber of substantial capacity for receiving sifted material, agitator means operable within said screen to effect passage of material through said screen, spaced collector means within said housing operable through said material receiving chamber for returning sifted material to said screen chamber to be again sifted therethrough, and power drive means for operating said agitating means and said collector means at speeds correlated to each other, said drive means including means for producing a plurality of movements of said agitator means over said screen during the passage of each successive collector means through said receiving chamber to effect the sifting of a quantity of the material into the receiving chamber intermediate the passage of each said collector means therethrough, such sifted quantities of material being returned at intervals to the screen chamber by said collector means to maintain a continually changing body of material therein and to secure effective intermixture of the entire body of material during sifting.

8. A flour sifting machine comprising a sifting screen having a screen surface of generally cylindrical form with an opening in its upper portion, a brush member within the screen mounted for movement in an arcuate path in contact with said screen for working flour therethrough, power drive means, means connecting said power drive means with said brush member providing for oscillating said brush member over said screen with a stroke of movement that does not carry the brush over said opening in the screen, and means driven by said power drive means for successively returning the sifted flour to said screen.

9. A sifting machine adapted to sift and uniformly mix flour and other pulverulent materials comprising a sifting screen having a screen surface of generally cylindrical form having an opening in its upper portion, a brush member within the screen mounted for movement in an arcuate path in contact with said screen for working flour therethrough, power drive means for operating said brush in an oscillatory path over said screen, collector means moving in an orbital path around said screen to successively return to the open portion of said screen the sifted flour, and means interconnecting said collecting means with said power drive means to provide for the driving thereof in timed relation to the oscillatory movements of said brush so that each return operation returns to the screen the material sifted therethrough by a plurality of oscillatory movements of said brush.

DONALD G. JENSEN.